United States Patent
Paterson et al.

(10) Patent No.: US 7,445,024 B2
(45) Date of Patent: Nov. 4, 2008

(54) ABOVE DECK MODULAR FAUCET ASSEMBLY

(75) Inventors: Graham H. Paterson, Wilmington, DE (US); Hui L. Lee, Taipei (TW); William J. Walbrandt, Kennett Square, PA (US); Michael D. Trenham, Wayne, PA (US)

(73) Assignee: Speakman Company, New Castle, DE (US)

( * ) Notice: Subject to any disclaimer, the term of this patent is extended or adjusted under 35 U.S.C. 154(b) by 234 days.

(21) Appl. No.: 11/327,871

(22) Filed: Jan. 9, 2006

(65) Prior Publication Data

US 2007/0157976 A1    Jul. 12, 2007

(51) Int. Cl.
*F16K 11/00* (2006.01)
*F16K 27/12* (2006.01)

(52) U.S. Cl. .................... 137/606; 137/549; 137/801; 251/129.04

(58) Field of Classification Search ............. 137/606, 137/607, 549, 801; 251/129.04
See application file for complete search history.

(56) References Cited

U.S. PATENT DOCUMENTS

| | | | | |
|---|---|---|---|---|
| 1,832,723 A | * | 11/1931 | Mueller | 137/606 |
| 3,770,004 A | * | 11/1973 | Johnson et al. | 137/315.12 |
| 3,968,816 A | * | 7/1976 | Tagansky | 137/606 |
| 4,064,900 A | * | 12/1977 | Schmitt | 137/315.12 |
| 4,356,574 A | * | 11/1982 | Johnson | 4/676 |
| 4,709,728 A | * | 12/1987 | Ying-Chung | 137/597 |
| 4,735,357 A | | 4/1988 | Gregory et al. | |
| 4,886,207 A | | 12/1989 | Lee et al. | |
| 4,894,874 A | | 1/1990 | Wilson | |
| 4,948,090 A | | 8/1990 | Chen | |
| 4,971,106 A | | 11/1990 | Tsutsui et al. | |
| 5,085,399 A | | 2/1992 | Tsutsui et al. | |
| 5,165,121 A | | 11/1992 | McTargett et al. | |
| 5,224,509 A | * | 7/1993 | Tanaka et al. | 137/315.03 |
| 5,618,023 A | * | 4/1997 | Eichholz et al. | 251/129.04 |
| 5,911,240 A | | 6/1999 | Kolar et al. | |
| 6,082,407 A | | 7/2000 | Paterson et al. | |
| 6,543,478 B2 | * | 4/2003 | Kline | 137/606 |
| 6,626,208 B2 | | 9/2003 | Chen | |
| 6,671,898 B1 | * | 1/2004 | Eggenberger et al. | 4/623 |
| 2004/0089350 A1 | | 5/2004 | Marty et al. | |
| 2004/0154673 A1 | * | 8/2004 | Mascari et al. | 137/801 |

* cited by examiner

*Primary Examiner*—Stephen M Hepperle
(74) *Attorney, Agent, or Firm*—Connolly Bove Lodge & Hutz LLP (57) ABSTRACT

A faucet is provided comprising in-service separable parts that can be removed from the faucet without having to remove the entire housing. The faucet includes a main support housing, bolts, brackets and nuts to secure the main support body to a sink surface, two water inlets for connecting hot and cold incoming water lines. A flow control assembly is provided at each inlet to regulate the hot and cold water introduced into a mixing chamber. The valve housing includes an independent adjustable mixing valve for regulating the flow of water, an inline screen filter for removing particulate matter from the water stream, and a check valve for preventing water from returning back to the water source. Upon passing through the check valve and into water mixing housing inlets, the water is mixed in a mixing chamber. From the mixing chamber the water is regulated by a solenoid. When sink users place their hands, or other objects in front of the sensor the solenoid is activated. This permits water to flow into the faucet head portion and ultimately to the user.

14 Claims, 6 Drawing Sheets

ABOVE DECK MODULAR FAUCET ASSEMBLY

FIELD OF THE INVENTION

The present invention relates in general to "above deck" faucets, which are characterized by having most, if not all, functional elements of the faucet above the sink deck. The present invention is further generally related to automatic service water taps or faucets which are activated electrically by a solenoid in response to an object, such as a hand, near the faucet outlet. These are often referred to as "sensor" faucets or "sensor operated faucets."

BACKGROUND OF THE INVENTION

It is desirable in a variety of applications to provide a lavatory faucet which turns on and off automatically, so that the user does not have to touch the faucet to operate it.

Electrically operated solenoid valves are known for use in sensor faucets. However, in a typical faucet of this type, an electric current is applied to an electromagnetic coil of a solenoid actuator to maintain a conventional solenoid valve open. Upon removal of the electric current, a spring forces the solenoid to close the valve. As a result, solenoid valves use a considerable amount of electricity to maintain them in an open position which makes them impractical for battery powered operation.

This invention relates in part to the use of modular in-line screens in a sensor faucet. Non-modular in-line screens have been used in faucets. For example, U.S. Published Patent Application 2004/0089350 to Marty et al. teaches in-line screens for thermostatic valves. The publication discloses a unitary valve body 22 with adjustable flow control assemblies 24 in the hot and cold water inlets 25 and 25a, respectively, to temper water through the valve (paragraph 022 and FIG. 2). Between the flow control assemblies 24 and the valve mixing chamber 26 are removable in-line screen assemblies 21 to filter out unwanted particulate matter (paragraph 0026 and FIG. 1). However, the in-line screens and flow control assemblies are not modular as contemplated by this invention.

U.S. Pat. No. 5,085,399 to Tsutsui et al. discloses a sensor operated faucet with separate piezoelectric actuators and associated diaphragms for each water inlet 130, 131. Each actuator diaphragm is separately controlled to regulate the temperature of fluid exiting the faucet (See col. 16, lines 3-11). A temperature sensor 170 in the water outlet piping 124 feeds a signal to the respective solenoids to control temperature (col. 17, lines 47-59 and FIG. 23). According to this patent, the mixing of hot and cold water is variously described as occurring in the outflow passage 124 (See column 15, lines 58-66 and FIG. 23) and in a T-shaped passage 134 adjacent the actuators and communicating with the outflow passage 124 (see column 16, lines 19-31 and FIG. 24). The operating components of this faucet are not modular, nor as readily serviced, as the components of the instant invention.

U.S. Pat. No. 4,735,357 to Gregory et al. teaches a sensor operated solenoid valve 82 that operates a valve member 80 which is retracted by the solenoid to indirectly open flow of water through the faucet (col. 8, lines 25-30, FIG. 4, 5). The patent mentions, but does not describe in detail, use of check valves and screens in the water inlets (col. 4, line 67 to col. 5, line 4). The temperature of the discharge water is regulated by temperature sensor 103 within the hot water supply pipe 75 which prevents scalding of the user when the hot water supply temperature exceeds a certain set point (col. 5, line 63-col. 6, line 10, FIG. 5-6). The interaction of the solenoid valve 82 and diaphragm 66 (FIG. 5) is described at col. 7, line 57 to col. 8, line 50. The patent does not describe the exact mode or location of mixing hot and cold water. It does not disclose components that are as readily serviceable as those if the instant invention.

Another solenoid operated faucet with sensor operation is U.S. Pat. No. 4,894,874 to Wilson, but in this faucet the solenoid operating valve 28 is below the sink deck where it is difficult to service.

Various other general details of solenoid operation in a sensor faucet are provided in U.S. Pat. Nos. 4,948,090 and 4,971,106, which are hereby incorporated by reference.

U.S. Pat. No. 5,618,023 to Eichholz, which is incorporated herein by reference, describes a battery pack for operating a sensor faucet, and more particularly, to a battery simulator that has the shape of a standard 6 volt lithium battery that converts an AC signal from a standard 110/120 volt power outlet to a DC signal for input at the battery terminals. However, the Eichholz battery simulator is complex and requires an expensive adapter to fit into the battery compartment. Thus, there is a need in the art to provide an AC power source that can be connected directly to the solenoid without needing a relatively expensive battery simulator.

The prior art therefore lacks a completely above deck, modular water faucet that can be worked on without removing the faucet from the deck and from which individual parts may be removed without removing, replacing, or otherwise altering other parts or the faucet itself.

SUMMARY OF THE INVENTION

A faucet is provided comprising in-service separable parts that can be removed from the faucet without having to remove the entire housing. The faucet includes a main body, an outer body that includes a decorative housing, bolts, brackets and nuts to secure the main body to a sink deck, and two water inlets for connecting hot and cold incoming water lines. A modular flow control assembly is provided at each inlet to regulate the hot and cold water introduced into a mixing chamber within the main body. The housing for the flow control assemblies includes an independent adjustable mixing valve for regulating the flow of water, an in-line filter for removing particulate matter from the water stream, and a check valve for preventing water from returning back to the water source. Upon passing through the flow control assemblies, water passes into a mixing chamber in the main body. From the mixing chamber the water is regulated by a solenoid. When sink users place their hands or other objects in front of a sensor, which is connected to the main housing, the solenoid is activated. This permits water to flow to the faucet outlet and ultimately to the user.

A faucet according to the present invention may also have the advantage of modularity. Each element of the faucet may be serviced, separated, removed, replaced, or repaired without replacing the entire faucet or removing the faucet from its mounting. Thus, the faucet life is extended by making maintenance and service much easier, thereby saving cost and aggravation.

A faucet according to the present invention may also have a modular flow control assembly and lower valve housing that have elongated fluid inlets that allow horizontal adjustment of the modular flow control assemblies within those inlets. Thus, the faucet can accommodate a variance in the separation distance between incoming water lines by sliding the modular flow control assemblies over the fluid inlets in the lower valve housing the valve body.

Within the modular flow control assemblies of the present invention is a metering valve to regulate the volume of hot or cold water introduced into lower valve housing. One portion of the metering valve may be threaded and provided with an opening shaped to receive an adjustment tool to allow the movement of the metering valve into and out of the path of water flowing into the flow control assembly.

The modular flow control assemblies may also include a filter for removing particulate matter from the water flowing therefrom into the flow control valve body. The filter may be provided with a threaded cap to allow the filter to be replaced or removed for cleaning.

The modular flow control assemblies may also comprise a check valve to prevent the flow of water back toward the water source. The check valve may be placed downstream of the filter to reduce the clogging of the check valve and other faucet parts caused by particulate matter.

A faucet according to the present invention may be provided with a 6V battery or two 3V batteries. Alternatively, the faucet may be equipped with an AC power source that can be connected to the battery pack without needing a relatively expensive battery simulator.

BRIEF DESCRIPTION OF THE DRAWINGS

Novel features and advantages of the present invention in addition to those noted above will be become apparent to persons of ordinary skill in the art from a reading of the following detailed description in conjunction with the accompanying drawings wherein similar reference characters refer to similar parts and in which.

DETAILED DESCRIPTION OF AN EMBODIMENT OF THE INVENTION

Figure 1:
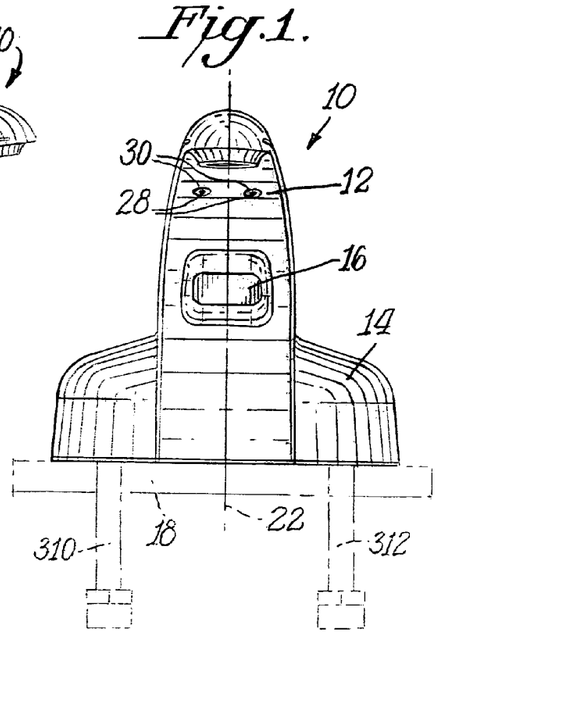
FIG. 1 shows a front elevational view of the faucet of the present invention.
Figure 2:
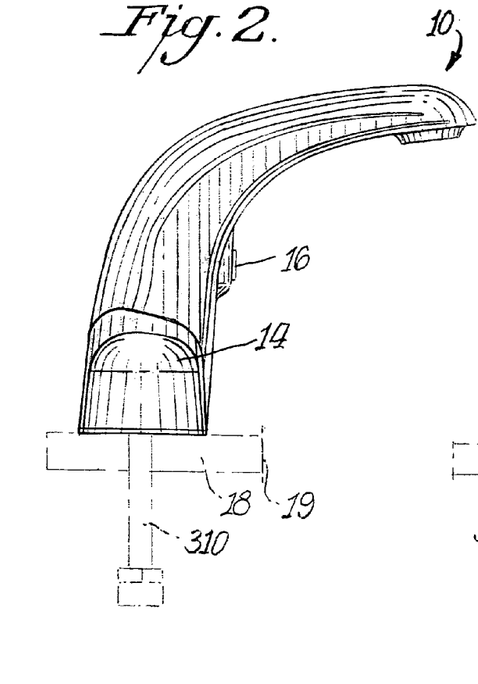
FIG. 2 is a left side elevational view of the faucet of FIG. 1.
Figure 3:
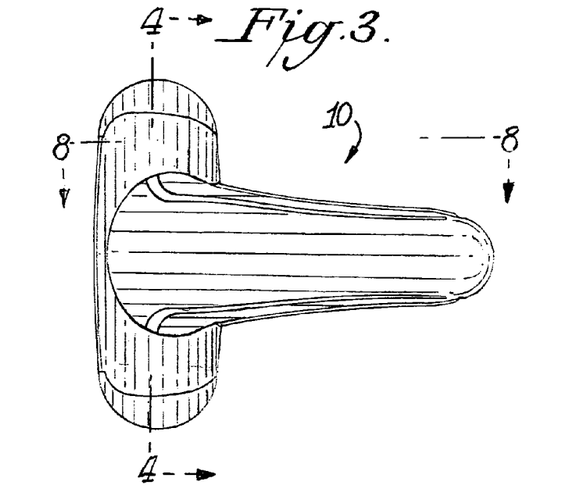
FIG. 3 is a top plan view of the faucet of FIG. 1.

FIG. 1 illustrates a faucet according to the present invention. The faucet 10 comprises a main support body 12, an outer decorative housing body 14, and a sensor 16. Sensor 16 may be a detection mechanism known in the art for detecting the presence of hands or other objects, for example, U.S. Pat. No. 6,082,407 issued to the assignee of this application, Speakman Company of Wilmington, Del., which is incorporated herein by reference. For example, sensor 16 may comprise an IR sensor or motion sensor. The mechanisms for operating the faucet and flow of water therethrough, which will be described in greater detail below, are preferably placed within the cavity formed between support body 12 and outer housing 14, as shown in FIGS. 1-3 and 9. Main support body 12 and outer housing 14 are constructed from durable materials which retain their shape, are dimensionally stable and resist efforts of vandals. These materials may include, for example, chrome plated zinc, polymer powder coated zinc, chrome plated brass, polymer powder coated brass, chrome plated acrylonitrile butadiene styrene (ABS) plastic, and/or solid plastic. To further provide vandal resistance, main support body 12 is mounted to a sink deck 18 in a manner similar to that described in the aforementioned patent assigned to Speakman Company. The faucet 10 defines a generally symmetrical design relative to intersecting centerline 22 shown in FIG. 1. As shown in FIG. 2, the faucet head may extend upwardly from the sink deck 18 and outward over a sink (not shown) at a location beyond the edge 19 of deck 18. At a minimum the faucet 10 should extend a sufficient upward and outward distance to accommodate the washing of human hands, or any other faucet functions, for example, those typical of a kitchen faucet. The faucet 10 can be connected to sink deck 18 in the manner described in U.S. Pat. No. 6,082,407 mentioned above.

The water inlet portions of the faucet will now be described with reference to FIG. 4. One flow control assembly 302 controls the delivery of water at one temperature and another flow-control assembly 304 may be used for delivery of water at another temperature. Preferably one assembly is for "cold water," i.e. lower than about 30° C., while the other is for "hot water," i.e. higher than about 30° C. Flow-control assemblies 302 and 304 may comprise flow control bodies 306 and 308, respectively. Flow control bodies 306 and 308 may be formed of any suitable material, including metal or plastic, and are preferably formed of brass. Incoming water lines 310, 312 may provide water from a well, municipality or other water source and are connected to the assemblies 302, 304 by suitable conventional means such as gluing, sweating or threading. Adapters 318 and 320 may be connected to, or integral with, water lines 310 and 312 for connection to the incoming water lines. Although one type of exemplary incoming water line 310, 312 is shown, any suitable piping can be used, including ½ inch National Pipe Taper (NPT) solid threaded shank.

Flow control assembly 302 is identical to and symmetrical with flow control assembly 304. Thus, for simplicity, further description will be made only with respect to flow control assembly 302. Additionally, because the assemblies are identical, a hot or cold water line can be connected to either side of the faucet 10.

Flow control body 306 comprises an adjustable metering valve 322 to regulate the volume of hot or cold water introduced into the inlet 418 of lower valve housing 416. Metering valve 322 is typically threaded and may be provided with an adjustment means 326, which may comprise an opening shaped to receive a screwdriver, Allen wrench, or any other suitable tool or may be formed in any other suitable manner to allow the movement of metering valve 322 into and out of the flow of water thru fluid passage 338 and thereby regulate flow therethrough. Thus, by adjusting metering valve 322 and the corresponding metering valve 322a on the opposite side of faucet 10, the flow through each can be regulated to achieve a desired mixed temperature as will be described in greater detail below. Metering valve 322 is provided with O-rings 330 and 332 to seal the device and prevent water from leaking. O-rings may comprise rubber or other suitable material for preventing water from leaking between two adjacent parts.

The water flow, regulated by metering valves 322 (and 322a), then passes through filter 342 to remove particulate matter from the water stream before the water enters check valve 354 and other internal components of faucet 10. This reduces clogging of small passages in these components with particulate matter. Filter 342 is contained in filter housing 346, which is sealed within filter opening 345. A cap 350 can be removably placed in on end of filter opening 345 and retained by threads 351. Rotation of cap 350 uncovers the opening 345 to allow the adjustment and/or removal of filter 342 and housing 346. Filter 342 may comprise metal, plastic, paper or other suitable filter material for filtering particulate matter from a water supply. For example, filter 342 may comprise metal mesh material. Filter housing 346 and cap 350 may comprise metal, plastic, or other suitable materials and the materials used for each need not be identical.

Water traveling through filter 342 then passes through check valve 354, thus preventing water from returning back to the water source. Check valve 354 may be sealed with O-ring 358, which may comprise rubber or other suitable material for preventing water from leaking. Check valves may be constructed in any suitable manner to prevent water from returning toward the water source. For example, check valve 354 may comprise a spring loaded wall (not shown) in which the spring is loaded in the direction opposite the water flow and maintains a sliding wall in closed position by holding the sliding wall against a wall with an opening, as shown, for example, in U.S. Pat. No. 6,626,208, which is incorporated herein by reference. When water comes through filter 342, the wall further loads the spring, but allows water to pass. If the flow reverses, the spring and the returning water force the sliding wall against the wall with the opening to close the check valve. The faucet may typically be operated at a pressure 70-80 psi, but may also be operated within a range from 15-150 psi.

Water exiting check valve 354 enters inlet 418 which is sealingly inserted in a mating conduit 360 extending from flow control body 306. Mating conduit 360 for receiving inlets 418 are sufficiently deep, and inlets 418 are sufficiently long, to allow these portions to be adjusted by laterally moving flow control assemblies 302 and 304 along the outside surface of inlets 418 of housing 416. Thus, the spacing of inlet water lines 310 and 312 need not be exactly 4 inches, 8 inches or the like, which allows for easier assembly of parts. Mating conduit 360 is sealed to the outside surface of inlet 418 with O-rings, which may be comprised of rubber or other suitable material for preventing water from leaking therebetween. Also, because the flow control assemblies 302, 304 are essentially identical in size, shape and operation, they may be used interchangeably with the hot and cold water inlets. Thus, a singular modular port plays multiple roles in the assembly of the faucet 10.

The water sources from flow-control bodies 306 and 308 are then mixed in mixing chamber 422. The water sources entering from assemblies 302 and 304 merge in a generally annular shaped space beneath a diaphragm 430 and surrounding outlet 456, a cross-section of which is shown in FIG. 4. Once in mixing chamber 422, any further flow of the water is regulated by a solenoid activated valve system according to an embodiment of the present invention described in greater detail below. The annular shape of mixing chamber 422 allows for efficient mixing of the of the two water sources to achieve a desired mixed temperature. Additionally, the shape and proximity of the mixing chamber 422 to outlet 456 improves flow characteristics through the faucet.

Figure 4:
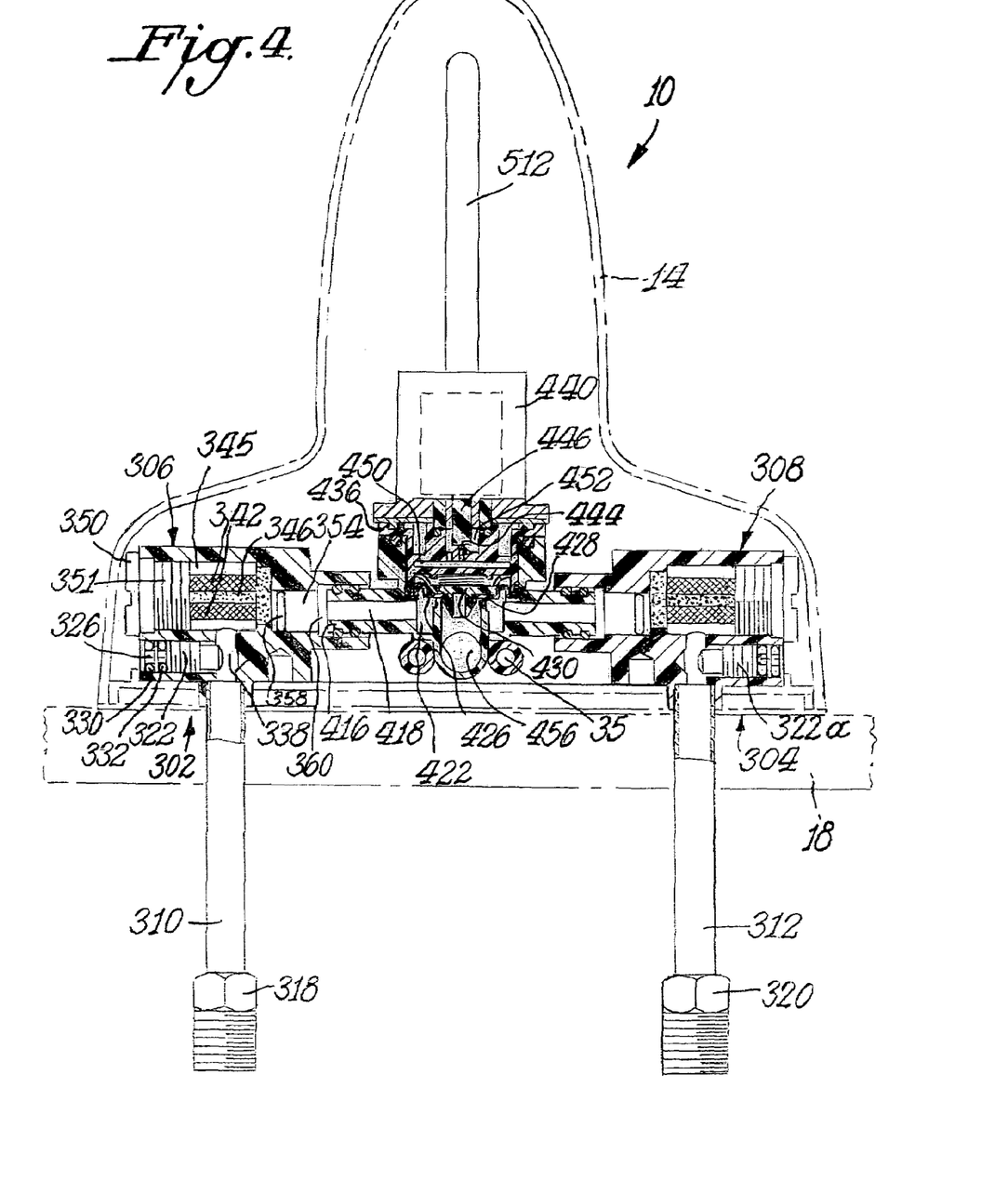
FIG. 4 shows a front elevational view of the faucet of the present invention as viewed along line 4-4 of FIG. 3.
Figure 5:
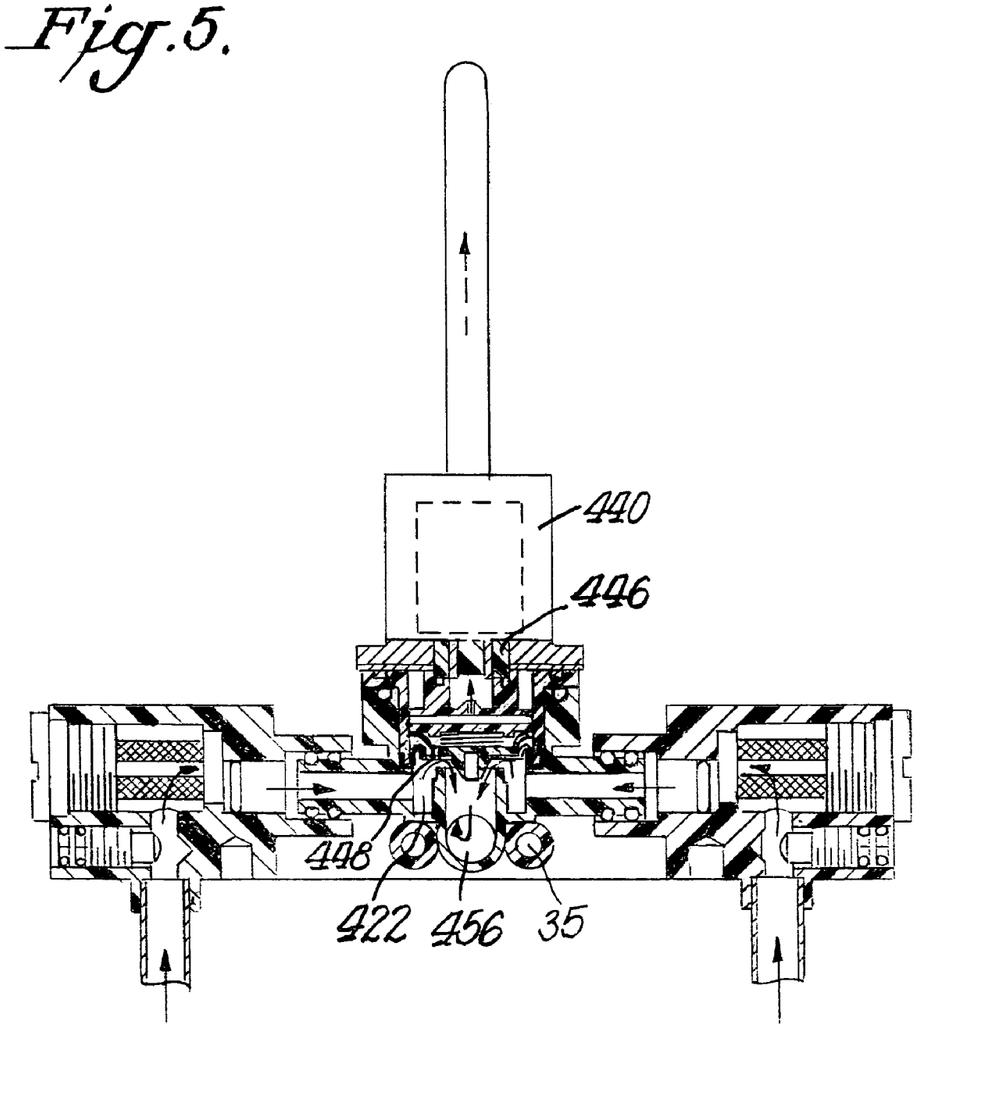
FIG. 5 shows portions of FIG. 4 with directional arrows to designate water flow and omits some of the faucet's structural features for simplicity.
Figures 6, 7:
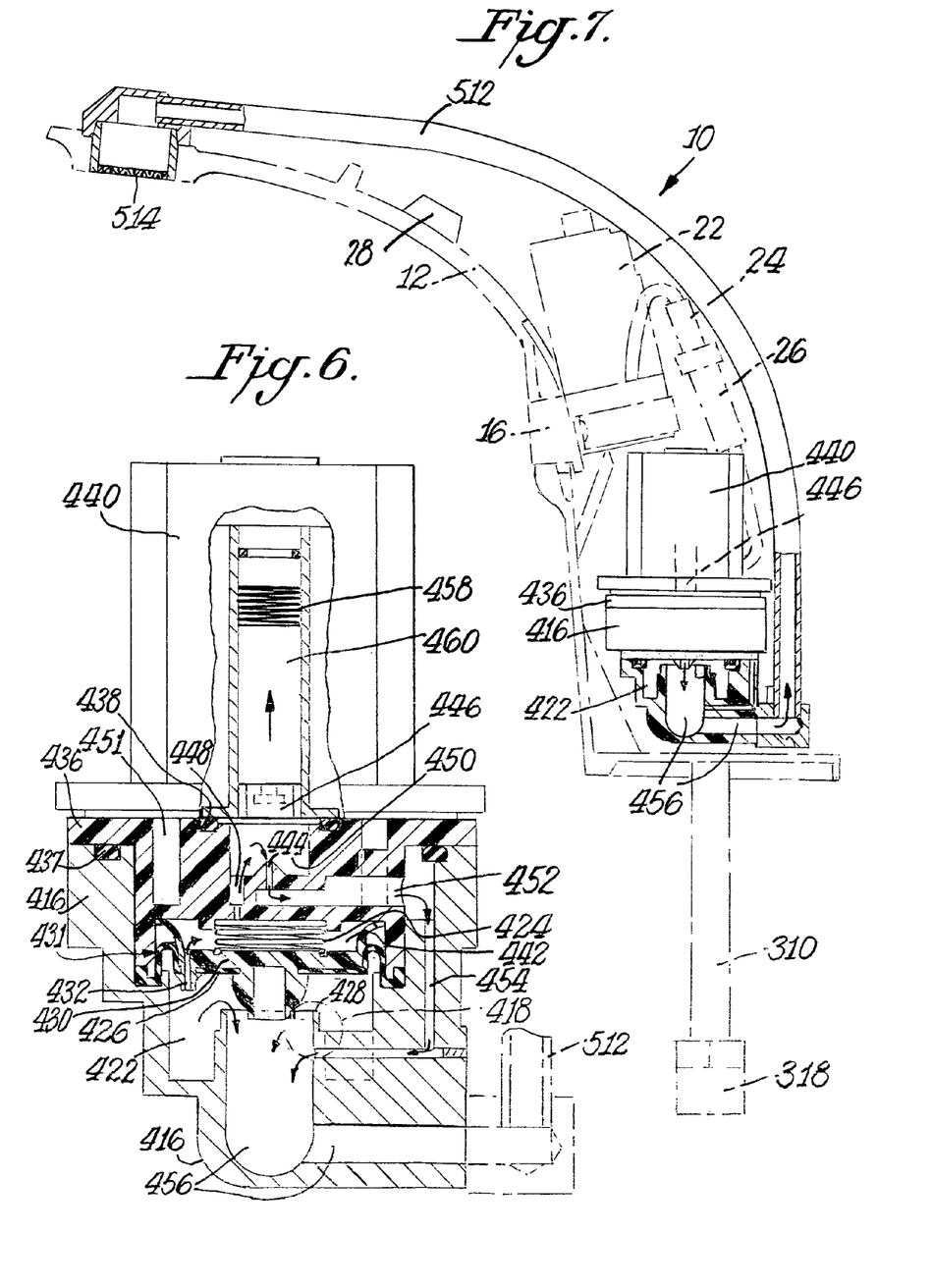
FIG. 6 is a cross-sectional view of the solenoid and water mixing housing according to the present invention, showing the water flow from one inlet to the valve outlet.
FIG. 7 is a side elevational view cutaway to show the positional relationship between the mixing chamber, discharge, and discharge piping as well as to show the aerator.
Figure 8:
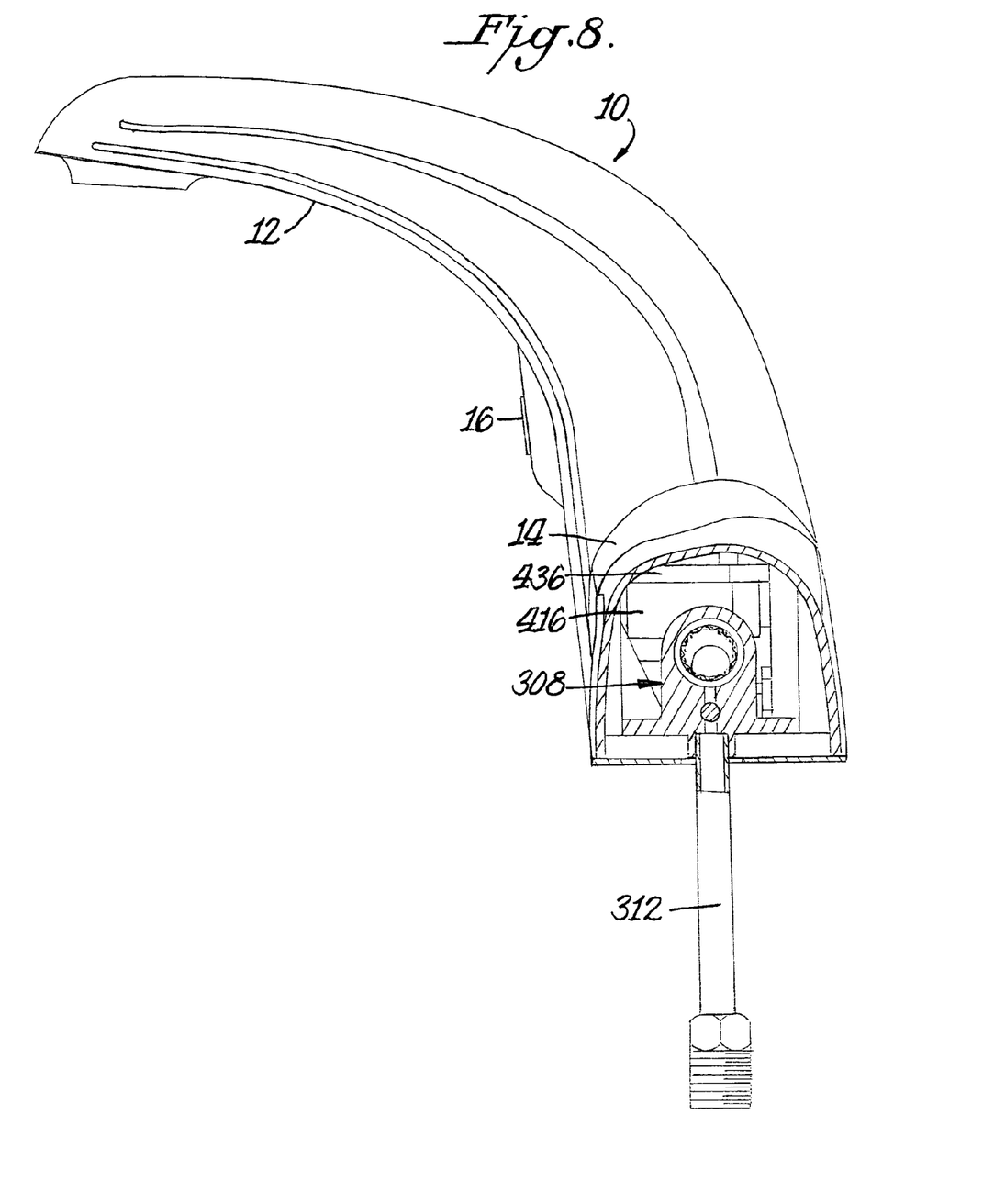
FIG. 8 is a cross-sectional view as viewed along line 8-8 of FIG. 3.

As shown in FIGS. 4, 5 and 6, the circular diaphragm 430 is arranged above the mixing chamber 422 to prevent water from flowing through the faucet until desired. The diaphragm 430 may comprise rubber, polymer, or any other suitable material. In FIG. 4, the diaphragm 430 is shown in a closed position, namely, that a circular, relatively rigid lower surface 426 of the diaphragm 430 is in water tight engagement with valve seat 428 near one end of mixing chamber 422. In this diaphragm position, water is prevented from flowing from the mixing chamber 422 through faucet 10. This is the "off" position for the faucet.

A relatively flexible web 431, which may comprise rubber, plastic, or other suitable material, flexibly retains the diaphragm 430 between lower valve housing 416 and upper valve housing 436 (FIG. 6). More particularly, the relatively flexible web 431 seals the space between lower valve housing 416 and upper valve housing 436 and permits vertical movement of diaphragm 430, as illustrated by comparing FIG. 4 to FIG. 5. The upward movement of diaphragm 430 permits flow of mixed hot and cold water from mixing chamber 422 into outlet 456, which is connected by the discharge piping 512 to the water outlet of faucet 10, as shown in FIGS. 5, 6 and 7.

Upper valve housing 436 may also be provided with an O-ring 437, preventing water from leaking between upper and lower valve housings. A solenoid 440 is mounted to upper valve housing 436. Solenoid 440 may be mounted and connected to upper valve housing 436 and/or lower valve housing 416 using screws, bolts or other fastening or connecting means and may be sealed with O-ring 438, as shown in FIG. 6. Thus, solenoid 440, lower valve housing 416 and upper valve housing 436 are enclosed and substantially sealed to prohibit water from leaking in areas other than where water is intended to enter or exit.

The operation of the faucet 10 is next described with particular reference to FIGS. 4, 5 and 6. FIG. 4 illustrates the operation of the faucet 10 in the "off", or non-water flow, position. As shown in this figure, diaphragm 430 and relatively flexible web 431 are sealingly engaged with valve seat 428 formed in the central portion of lower valve housing 416 to prevent water flow. They are maintained in this position by essentially equal water pressure on the top and bottom surfaces of diaphragm 430. This pressure equalization is maintained by bleed hole 432 (FIG. 6). This bleed hole 432 allows pressurized water from mixing chamber 422 to enter the area above diaphragm 430 and thereby equalize pressure across diaphragm 426. Because the pressure on either side of diaphragm 430 is equalized, an extra force is needed to hold the diaphragm 430 in sealing contact with valve seat 428. That force is provided by a spring 424 which gently biases diaphragm 426 downward against valve seat 428 (See FIG. 6) when the faucet is "off".

To initiate flow through faucet 10 it is necessary to overcome the biasing force of spring 424 and separate diaphragm 430 from valve seat 428. This is achieved through operation of a solenoid 460 that reduces the pressure of the water in area 442 above diaphragm 430. When the pressure in this area 442 above the diaphragm 430 is reduced, inlet water pressure in mixing chamber 422 below the diaphragm 430 pushes upon the diaphragm (as illustrated in FIGS. 5 and 6) and separates the ridged lower surface 426 of diaphragm 430 from valve seat 428. When that occurs, mixed hot and cold water from mixing chamber 422 is then free to flow to outlet 456 (FIGS. 5 and 6) and then to the faucet outlet 514 (FIG. 7).

As just mentioned, solenoid 460 has an important role in causing this flow of water through faucet 10. More particularly, solenoid 460 is energized, in response to a signal from sensor 16 that a user's hand or other object is under faucet outlet 514. That signal activates a switch (not shown) that sends energy from battery 22 within housing 14 to solenoid 460. That energy activates the solenoid to retract a plunger 446 within the solenoid. The lower end of the plunger 446 is shaped to cover a secondary bleed hole 444 which directly connects the area above diaphragm 430 with outlet 456 when the plunger 446 is retracted by solenoid 460. When the plunger 446 is lifted from bleed hole 444, pressure above diaphragm 430 is relieved allowing the accumulated water above the diaphragm to pass out through bleed holes 448 and 444 and thereafter to the discharge 456 through conduit 454 as illustrated in FIG. 6. As that water pressure is relieved the diaphragm 430 lifts off valve seat 428 allowing free flow of mixed hot and cold water through faucet 10, namely, directly from mixing chamber 422 to discharge 456 as shown by the arrows in FIG. 6.

The plunger 446 is normally biased into a sealed position over bleed means 444 by action of biasing means 458. Thus, when the sensor 16 does not sense a faucet user, the plunger is biased into a position covering the bleed means 444. In that situation, flow through the faucet 10 is turned off because the pressure above and below diaphragm 426 has been equalized, thereby reseating it on valve seat 428.

The solenoid 460 may be AC or DC powered. The battery pack 22, shown in phantom in FIG. 7 has battery snap connection 24 suited to fit snap connection 26. Thus, batteries may be easily installed and removed. A battery unit diode stepdown may be used for 12 volt to 6 volt operation. For example, the faucet can be plugged into a standard 120V outlet with a standard step down transformer to 12 volt DC. The 12 volt feed from the transformer can be fed thru connection 26 to battery diode 26 where the voltage is further stepped down to 6 volts.

Figure 9:
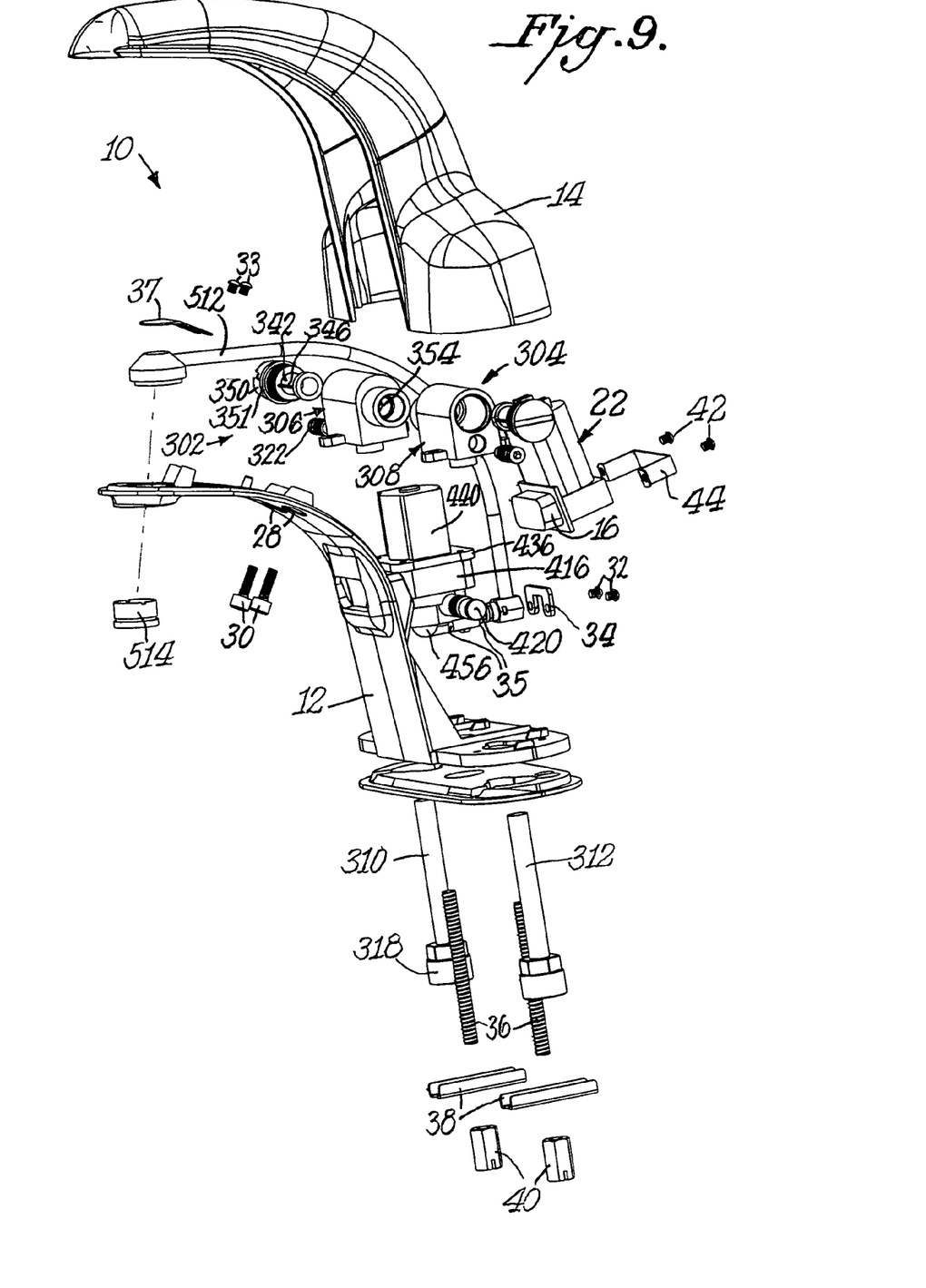
FIG. 9 is an exploded view of a faucet according to the present invention.

As the faucet is modular in nature, individual parts may be removed in-situ. Outer housing 14 may be removed with two screws 30 inserted through holes 28 in housing 12, as shown in FIGS. 1 and 9. The ends of screws 30 may be provided with one or more openings shaped to receive an adjustment tool, such as a screw driver or Allen wrench or may have a uniquely shaped opening for a uniquely shaped tool to discourage tampering or vandalism. The location of screws 30 in a recessed region of the underside of faucet 10 enhances the elegance of the faucet by hiding the screws from plain view, as well as further discouraging vandals, who may not immediately notice the screws. This configuration allows the faucet to remain secured to the sink deck 18 with bolts 36, brackets 38 and nuts 40 (FIG. 9). Thus, faucet 10 does not need to be dismounted from its operating position on deck 18 during service.

Once outer housing 14 is removed, all components may be serviced or replaced. For example, filters 342 may be removed to clean out any debris that may have collected during operation of faucet 12. Furthermore, as shown in FIG. 9, screws 32, which may secure a bracket 34 to housing 416 at threaded holes 35, and screws 33 which may secure a bracket 37 which may be removed to service, remove or replace, the discharge piping 512 and aerator 514. Also, aerator 514 is connected to discharge piping 512, which is located wholly within support body 12 and outer housing 14 to additionally discourage vandals from removing the aerators. Batteries can be easily replaced because the battery pack 22 easily separates by removing bolts 42 and bracket 44 to permit insertion of batteries.

The foregoing description of the invention illustrates and describes an embodiment of the present invention. However, it is to be understood that the invention is capable of use in various other combinations, modifications, and environments and is capable of changes or modifications within the scope of the inventive concept as expressed herein, commensurate with the above teachings, and/or the skill or knowledge in the art of faucets, and more particularly automatic water faucets. Accordingly, the description is not intended to limit the invention to the form disclosed herein. Rather, it is intended that the appended claims be construed to include alternative embodiments.

The invention claimed is:

1. A modular faucet comprising:
   a first flow control valve body comprising a first metering valve, a first inline filter, and a first check valve;
   a second flow control valve body comprising a second metering valve, a second inline filter, and a second check valve;
   a main valve housing comprising an upper valve housing and a lower valve housing, wherein the lower valve housing is sized and shaped to slidingly connect with first flow control valve body and second control valve body, wherein the lower valve housing includes mixing chamber for allowing mixing of water traveling from the first and second flow control valve bodies, and wherein a diaphragm controls water flowing into a water discharge piping when the faucet is activated and prevents water from flowing into the water discharge piping when the faucet is not engaged; and
   an electronic solenoid for controlling the diaphragm.

2. The modular faucet according to claim 1, wherein the first flow control valve body is connected to a first water line for supplying water to the first flow control body and the second control valve body is connected to a second water line for supplying water to the second flow control body.

3. The modular faucet according to claim 1 wherein the mixing chamber has a generally annular shape.

4. The modular faucet according to claim 2, wherein the first check valve is placed after the first inline filter with respect to the water flow from the first water line and the second check valve is placed after the second inline filter with respect to the water flow from the second water line.

5. The modular faucet according to claim 1, further comprising a support housing and an outer housing, wherein the support housing and outer housing substantially enclose and surround the first flow control valve body, the second control valve body, the main valve housing, the water discharge piping, and the electronic solenoid, and wherein the support housing and outer housing are affixed to a substrate and the support housing and outer housing are above the substrate.

6. The modular faucet according to claim 1, wherein the water discharge piping is removably connected to discharge piping, the discharge piping connected to an aerator.

7. The modular faucet according to claim 1, wherein the first metering valve is threaded for insertion into a first threaded opening within first flow control body for receiving the first metering valve, the first threaded opening within the first flow control body intersecting the water flow, wherein the movement of the first metering valve along the first threaded opening within the first flow control body allows the water flow to be at least partially obstructed, the first metering valve further comprising an outward facing end shaped to receive an adjustment tool; and wherein the second metering valve is threaded for insertion into a first threaded opening within second flow control body for receiving the second metering valve, the first threaded opening within the second flow control body intersecting the water flow, wherein the movement of the second metering valve along the first threaded opening within the second flow control body allows the water flow to be at least partially obstructed, the second metering valve further comprising an outward facing end shaped to receive the adjustment tool.

8. The modular faucet according to claim 7, wherein the first and second meter valve outward facing ends have substantially similar recessed shapes for receiving an adjustment tool.

9. The modular faucet according to claim 1, wherein the first inline filter is threaded for insertion into a second threaded opening within first flow control body for receiving the first mime filter, the second threaded opening within the first flow control body intersecting the water flow, wherein the movement of the first inline filter along the second threaded opening within the first flow control body allows water to at least partially flow through the second inline filter, the first inline filter further having an outward facing end shaped to receive an adjustment tool; and wherein the second inline filter is threaded for insertion into a second threaded opening within second flow control body for receiving the second inline filter, the second threaded opening within the second flow control body intersecting the water flow, wherein the movement of the second inline filter along the second threaded opening within the second flow control body allows water to at least partially flow through the second inline filter, the second inline filter further having an outward facing end shaped to receive an adjustment tool.

10. The modular faucet according to claim 9, wherein the adjustment tool is a screwdriver.

11. The modular faucet according to claim 1, wherein the solenoid is powered by a battery pack.

12. The modular faucet according to claim 11, wherein the battery pack comprises a transformer for converting a 120V AC signal to a 12 V DC signal and a battery diode for reducing the 12V current to 6 volts.

13. The modular faucet according to claim 12, wherein the solenoid is powered by a 120V AC power source connected to the transformer.

14. A readily serviceable sensor operated faucet comprising:
- a rigid main body fixedly attachable to a sink deck and extending above and away from the deck into an area where the faucet discharges fluid;
- a vandal resistant durable outer body removably attached to the main body with no more than two fasteners;
- a first flow control valve body in the main body comprising a first metering valve for controlling the flow of water from a first water source, a first inline filter, and a first check valve;
- a second flow control valve body in the main valve body comprising a second metering valve for controlling the flow of water from a second water source, a second inline filter, and a second check valve; and
- sensor operated valving, power supply and wiring for connecting the power supply to the sensor operated valving, and discharge piping contained within the space between the main and outer body and each being readily serviceable by removal of the outer body from the main body.

* * * * *

UNITED STATES PATENT AND TRADEMARK OFFICE
CERTIFICATE OF CORRECTION

PATENT NO. : 7,445,024 B2 Page 1 of 1
APPLICATION NO. : 11/327871
DATED : November 4, 2008
INVENTOR(S) : Graham H. Paterson et al.

It is certified that error appears in the above-identified patent and that said Letters Patent is hereby corrected as shown below:

In Claim 9, in column 9, on line 9 "the first mime filter, the second threaded opening with the" should read -- the first inline filter, the second threaded opening with the --.

Signed and Sealed this

Sixth Day of January, 2009

JON W. DUDAS
*Director of the United States Patent and Trademark Office*